US010684429B2

(12) United States Patent
Inoue et al.

(10) Patent No.: US 10,684,429 B2
(45) Date of Patent: Jun. 16, 2020

(54) OPTICAL COMPONENT, METHOD FOR MANUFACTURING OPTICAL COMPONENT, AND OPTICAL CONNECTOR CABLE

(71) Applicant: SUMITOMO ELECTRIC INDUSTRIES, LTD., Osaka-shi, Osaka (JP)

(72) Inventors: Takeshi Inoue, Osaka (JP); Taisuke Nagasaki, Osaka (JP); Toshihisa Yokochi, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/170,552

(22) Filed: Oct. 25, 2018

(65) Prior Publication Data

US 2019/0129106 A1  May 2, 2019

(30) Foreign Application Priority Data

Oct. 27, 2017 (JP) ................... 2017-208520

(51) Int. Cl.
*G02B 6/42* (2006.01)
*G02B 6/36* (2006.01)

(52) U.S. Cl.
CPC .......... *G02B 6/4224* (2013.01); *G02B 6/425* (2013.01); *G02B 6/4214* (2013.01); *G02B 6/3652* (2013.01); *G02B 6/4206* (2013.01); *G02B 6/428* (2013.01); *G02B 6/4292* (2013.01)

(58) Field of Classification Search
None
See application file for complete search history.

(56) References Cited

U.S. PATENT DOCUMENTS

| 2012/0182459 | A1 | 7/2012 | Wada |
| 2013/0259423 | A1 | 10/2013 | Charbonneau-Lefort |
| 2015/0062565 | A1 | 3/2015 | Hung |
| 2017/0176684 | A1* | 6/2017 | Miller ...................... G02B 6/30 |

FOREIGN PATENT DOCUMENTS

| JP | 2014-137410 A | 7/2014 |
| WO | WO-2011/040136 A1 | 4/2011 |

* cited by examiner

*Primary Examiner* — Jerry Rahll
(74) *Attorney, Agent, or Firm* — Faegre Drinker Biddle & Reath LLP

(57) ABSTRACT

An optical component including an optical device, a substrate, and a lens component is disclosed. The substrate has a mounting surface on which the optical device is mounted and at least two reference marks are provided. The lens component is disposed on the substrate. The lens component includes a first surface, a second surface, a lens, at least two first transmission regions formed on the first surface, and at least two second transmission regions formed in positions facing the first transmission regions on the second surface. Each of the second transmission regions is smaller than the corresponding first transmission region. The lens component is attached to the substrate so that each of the second transmission regions is located within the corresponding first transmission region and each of the reference marks is located within the corresponding second transmission region when viewed along an observation direction orthogonal to the first surface.

14 Claims, 8 Drawing Sheets

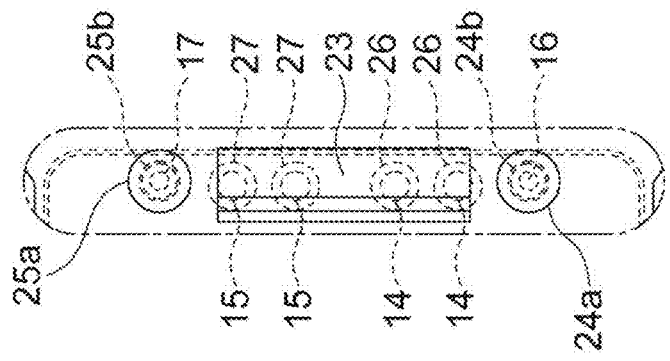
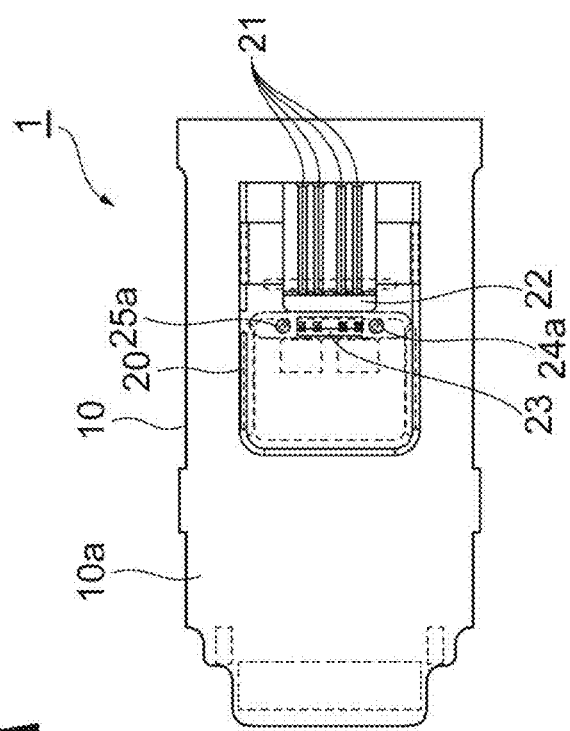
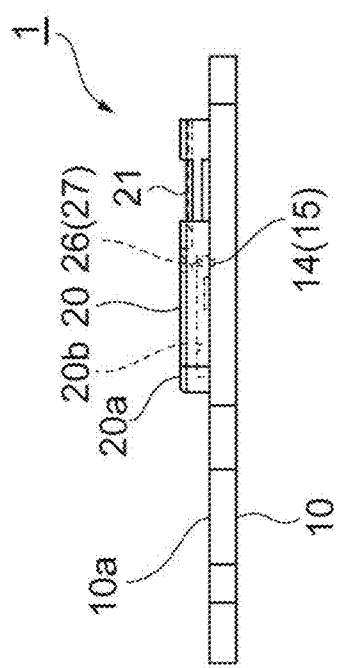

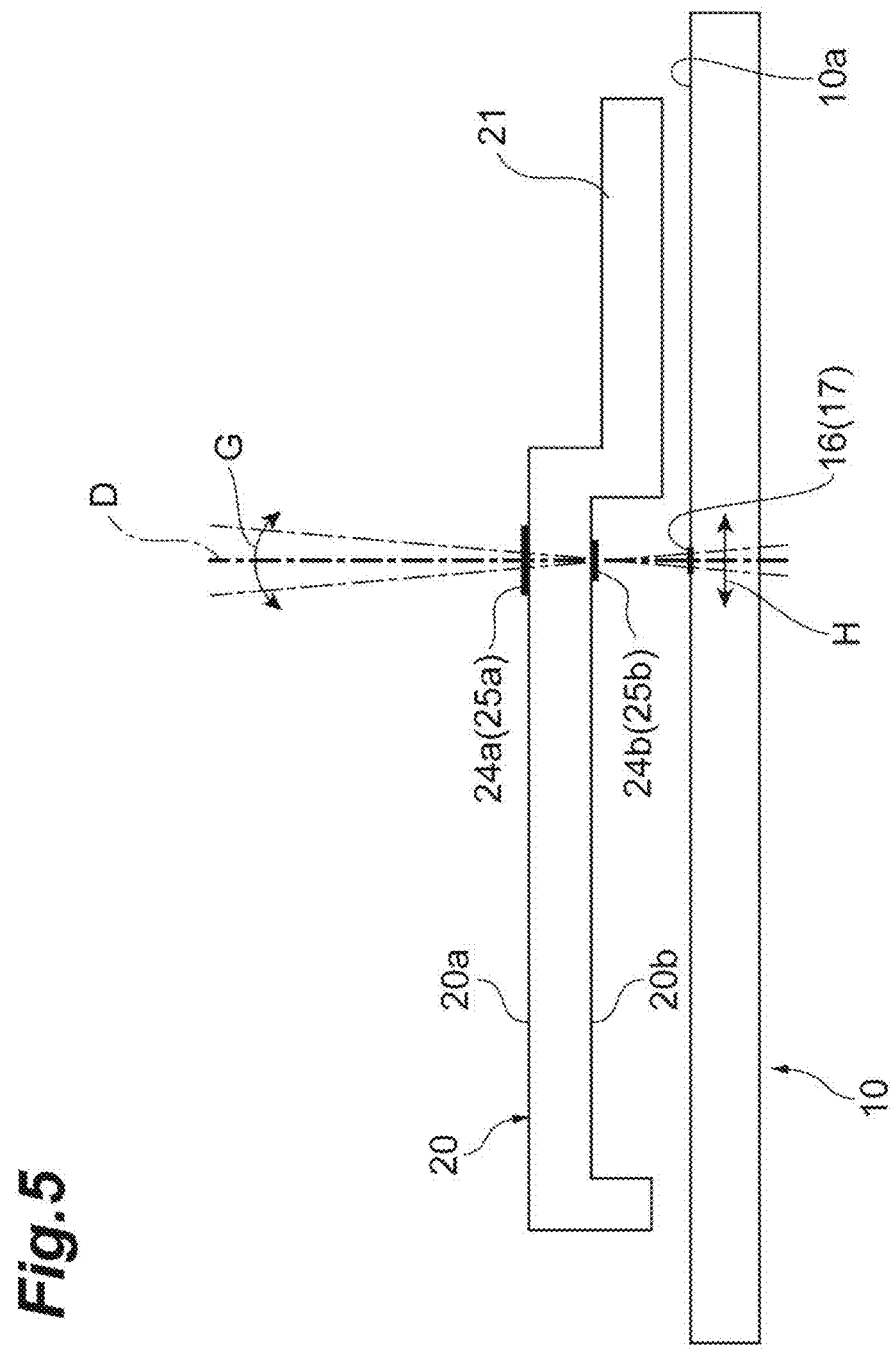

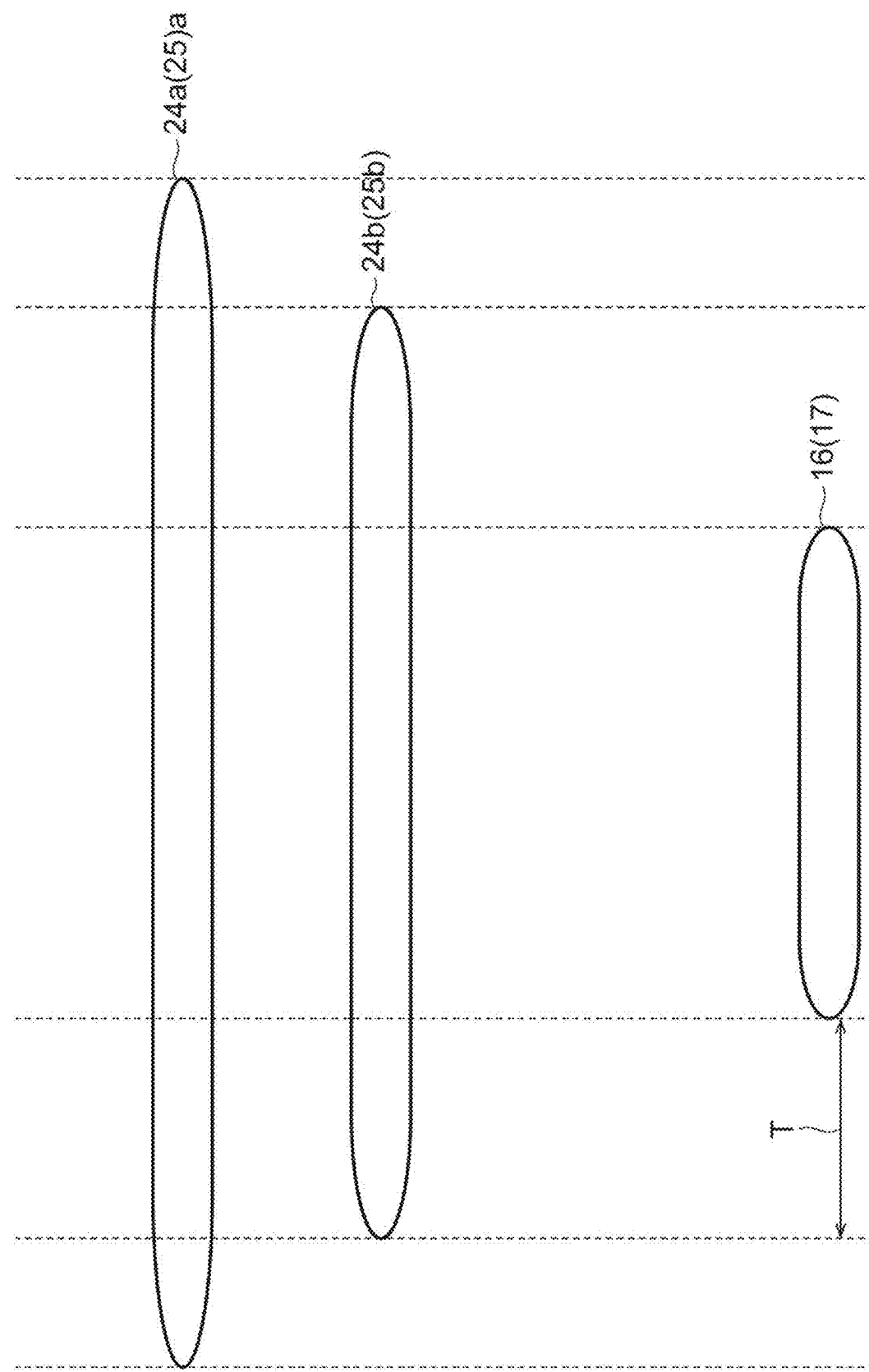

OPTICAL COMPONENT, METHOD FOR MANUFACTURING OPTICAL COMPONENT, AND OPTICAL CONNECTOR CABLE

CROSS-REFERENCE TO RELATED APPLICATION

The present application is based on and claims the benefit of priority of Japanese Patent Application No. 2017-208520, filed on Oct. 27, 2017, the entire content of which is incorporated herein by reference.

TECHNICAL FIELD

The present disclosure relates to an optical component, a method for manufacturing an optical component, and an optical connector cable.

BACKGROUND

U.S. patent application publication No. US2013/0259423 discloses an optical assembly that provides alignment marks on an upper surface of a circuit board and performs centering of alignment holes in an optical module with respect to the alignment marks, thereby performing alignment between the module and the circuit board. Japanese patent application publication No. JP2014-137410 discloses aligning markers provided on the bottom surface of a lens array with markers on an electric board by using an imaging device, thereby achieving centering.

SUMMARY

The present disclosure provides an optical component. The optical component comprises an optical device, a substrate, and a lens component. The substrate has a mounting surface on which the optical device is mounted and at least two reference marks are provided. The lens component is disposed on the mounting surface of the substrate. The lens component includes a first surface located outside, a second surface opposite to the first surface and located inside, the second surface facing the mounting surface, a lens configured to optically couple to the optical device, at least two first transmission regions formed on the first surface, and at least two second transmission regions formed in positions facing the first transmission regions on the second surface. Each of the second transmission regions is smaller than the corresponding first transmission region. The lens component is attached to the substrate so that each of the second transmission regions is located within the corresponding first transmission region and each of the reference marks on the substrate is further located within the corresponding second transmission region when viewed along an observation direction orthogonal to the first surface.

The present disclosure further provides a method for manufacturing an optical component. The method comprises (a) providing a substrate having a mounting surface on which an optical device is mounted and at least two reference marks are provided, (b) providing a lens component including a first surface, a second surface opposite to the first surface, a lens configured to optically couple to the optical device, at least two first transmission regions formed on the first surface, and at least two second transmission regions formed in positions facing the first transmission regions on the second surface, each of the second transmission regions being smaller than the facing first transmission region, (c) placing the lens component on the mounting surface of the substrate and adjusting an observation direction so that each of the second transmission regions is located within the corresponding first transmission region, (d) performing centering between the lens component and the substrate after adjusting the observation direction so that each of the reference marks on the substrate is located within the corresponding second transmission region when viewed along the observation direction, and (e) attaching the lens component to the substrate after performing the centering.

The present disclosure further provides an optical connector cable. The optical connector cable comprises the above optical component, and an optical fiber cable including at least one optical fiber. The optical fiber has an end to be installed to the optical component. The optical fiber cable is attached to the optical component so that the optical fiber is optically coupled to the optical device through the lens.

The present disclosure further provides a lens component. The lens component comprises a first surface, a second surface opposite to the first surface, a lens configured to optically couple to an external optical device, at least two first transmission regions formed on the first surface, at least two second transmission regions formed in positions facing the first transmission regions on the second surface, and an uneven region of the first surface. The uneven region surrounds the first transmission regions. Each of the second transmission regions is smaller than the facing first transmission region, and an arithmetic mean roughness Ra of the uneven region is greater than or equal to 0.20 μm.

BRIEF DESCRIPTION OF THE DRAWINGS

The foregoing and other purposes, aspects and advantages will be better understood from the following detailed description of embodiments of the disclosure with reference to the drawings, in which:

FIG. 4A is a plan view showing the optical component in which the lens component is mounted on the circuit board, FIG. 4B is a partially enlarged plan view of the optical component, and FIG. 4C is a sideview of the optical component.

FIG. 5 is a schematic cross-sectional view for explaining a process for alignment G and centering H performed when the lens component is attached to the circuit board.

FIG. 6 is a diagram showing a relationship among the sizes (outer diameters or widths) of the first transmission region, the second transmission region, and the reference mark on the substrate.

DETAILED DESCRIPTION

Figure 1A:
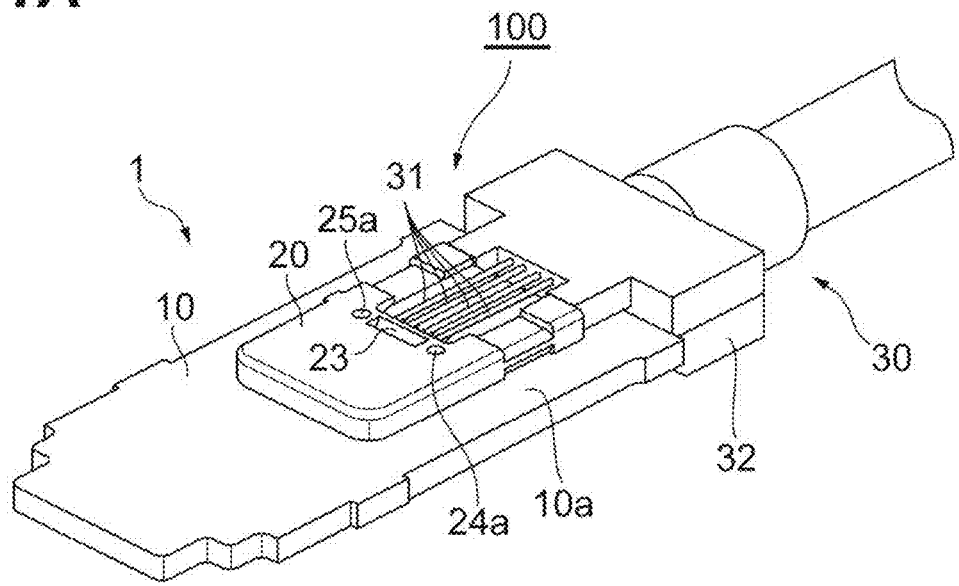
FIG. 1A is a perspective view showing one embodiment of an optical connector cable.

Problem to be Solved by the Present Disclosure

The optical assembly of US2013/0259423 provides alignment holes in the optical module in which an optical lens array is formed and further provides a lid for preventing foreign matters from entering the inside of the optical assembly. A method for manufacturing an optical assembly of JP2014-137410 performs alignment (centering) during observation using an imaging device so that the markers on the substrate overlap with the markers formed on the bottom surface of the optical lens array disposed above and apart from the markers on the substrate. However, if the observation axis of the imaging device is tilted with respect to the surface of the optical lens array or the circuit board on which the markers are formed in the above method, while the markers on the optical lens array and the markers on the circuit board are observed along an oblique direction, centering is performed in such a manner that they overlap each other in this direction. Accordingly, the above optical assembly may cause the optical lens array to be attached to the circuit board in a state where the lens array is deviated from a desired position, and therefore misalignment between optical fibers attached to the lens array and light receiving/emitting elements on the circuit board may decrease the coupling efficiency when the optical fibers and the light receiving/emitting elements are optically coupled to each other through the lens array.

Advantageous Effect of the Present Disclosure

This disclosure improves the efficiency of optical coupling between an optical device and a lens or an optical fiber.

Description of Embodiments of the Present Disclosure

The embodiments of the present disclosure will be listed and described. An optical component according to one embodiment of the present disclosure comprises an optical device, a substrate, and a lens component. The substrate has a mounting surface on which the optical device is mounted and at least two reference marks are provided. The lens component is disposed on the mounting surface of the substrate. The lens component includes a first surface located outside, a second surface opposite to the first surface and located inside, the second surface facing the mounting surface, a lens configured to optically couple to the optical device, at least two first transmission regions formed on the first surface, and at least two second transmission regions formed in positions facing the first transmission regions on the second surface. Each of the second transmission regions is smaller than the corresponding first transmission region. The lens component is attached to the substrate so that each of the second transmission regions is located within the corresponding first transmission region and each of the reference marks on the substrate is further located within the corresponding second transmission region when viewed along an observation direction orthogonal to the first surface.

The above optical component provides the first transmission regions on the first surface, and the second transmission regions in positions facing the first transmission regions on the second surface. The second transmission regions are smaller than the first transmission regions. In addition, the lens component is attached to the substrate so that each second transmission region is located within the corresponding first transmission region and each reference mark on the substrate is further located within the corresponding second transmission region. Since each second transmission region is located within the corresponding first transmission region, centering between the optical device and the lens can be performed so that each reference mark is located within the corresponding second transmission region along the axis orthogonal to the first surface. Thus, the optical component can improve the efficiency of optical coupling between the optical device and the lens. In addition, use of such a simple alignment mechanism gives a low-cost optical component with a low component count.

In one embodiment, the lens component may be composed of a transparent resin. This embodiment facilitates the alignment between the first transmission region and the corresponding second transmission region, and the alignment between the second transmission region and the corresponding reference mark. In addition, since the first transmission regions and the second transmission regions, which serve as the positioning marks of the lens component, do not form space voids, this embodiment suppresses the entry of foreign matters into the optical component, and eliminates the need for providing a separate lid member for suppressing the entry of foreign matters.

In one embodiment, an arithmetic mean roughness Ra in each of the first transmission regions may be less than or equal to 0.02 μm, and an arithmetic mean roughness Ra of the first surface around each of the first transmission regions may be greater than or equal to 0.20 μm. This embodiment defines the outer edge of the first transmission region so that the alignment between the first transmission region and the second transmission region can be performed more reliably. In other words, this embodiment further improves the efficiency of optical coupling between the optical device and the lens by more reliably performing tilt adjustment on the observation axis of the lens component. Note that "arithmetic mean roughness Ra" can be defined according to JIS B 0601:2013.

In one embodiment, a maximum height roughness Rz in each of the first transmission regions may be less than or equal to 0.5 μm, and a maximum height roughness Rz of the first surface around each of the first transmission regions may be greater than or equal to 2.0 μm. This embodiment defines the outer edge of the first transmission region so that the alignment between the first transmission region and the second transmission region can be performed more accurately. In other words, this embodiment further improves the efficiency of optical coupling between the optical device and the lens by more reliably performing axis alignment through adjustment of tilt with respect to the observation axis of the lens component. Note that "maximum height roughness Rz" can be defined according to JIS B 0601:2013.

In one embodiment, the transmittance of visible light entering each of the first transmission regions and emerging from the corresponding second transmission region facing the first transmission region may be higher than the transmittance of visible light entering the first surface around each of the first transmission regions and emerging from the second surface around the corresponding second transmission region. In this case, the alignment between the first transmission region and the second transmission region, and the alignment between the second transmission region and the reference mark can be performed more reliably. In other words, this embodiment further improves the efficiency of optical coupling between the optical device and the lens by more reliably performing centering through adjustment of tilt with respect to the observation axis of the lens component and alignment in the plane direction between the substrate and the lens component. Here, "visible light" is light with a wavelength in the range of, for example, 480 nm to 800 nm.

In one embodiment, each reference mark may include a metal pattern. In this embodiment, the reference marks are easily recognized, which leads to more reliable alignment between the second transmission region and the reference mark. In other words, this embodiment further improves the efficiency of optical coupling between the optical device and the lens more reliably by performing centering through alignment in the plane direction between the substrate and the lens component.

In one embodiment, the outer diameter or width of each of the first transmission regions may be at least 1.25 times the outer diameter or width of the second transmission region. In this embodiment, alignment between the first transmission region and the second transmission region leads to more reliable tilt adjustment for the lens component. In other words, this embodiment further improves the efficiency of optical coupling between the optical device and the lens by more reliably performing tilt adjustment on the observation axis of the lens component.

In one embodiment, the lens component may be attached to the substrate so that the center of each of the first transmission regions, the center of corresponding second transmission region, and the center of each reference mark may be aligned when viewed along the observation direction. This embodiment further improves the efficiency of optical coupling between the optical device and the lens more reliably by performing centering through adjustment of tilt with respect to the observation axis of the lens component and alignment in the plane direction between the substrate and the lens component.

In another embodiment, the optical device may be located between the reference marks on the mounting surface. In this case, the optical device and the reference marks may be aligned in one direction. In other embodiment, the lens component may further include at least one channel provided on the first surface, and a light reflective surface configured to change a propagation direction of light. The light reflective surface may be located between the first transmission regions. In other embodiment, each shape of the reference marks may be a circle, an ellipse, a square, a triangle, or a star shape.

A method for manufacturing an optical component according to one embodiment of the present disclosure comprises, (a) providing a substrate having a mounting surface on which an optical device is mounted and at least two reference marks are provided, (b) providing a lens component including a first surface, a second surface opposite to the first surface, a lens configured to optically couple to the optical device, at least two first transmission regions formed on the first surface, and at least two second transmission regions formed in positions facing the first transmission regions on the second surface, each of the second transmission regions being smaller than the facing first transmission region, (c) placing the lens component on the mounting surface of the substrate and adjusting an observation direction so that each of the second transmission regions is located within the corresponding first transmission region, (d) performing centering between the lens component and the substrate after adjusting the observation direction so that each of the reference marks on the substrate is located within the corresponding second transmission region when viewed along the observation direction, and (e) attaching the lens component to the substrate after performing the centering.

This manufacturing method provides the configuration where the second transmission region on the second surface is smaller than the first transmission region on the first surface in the lens component. When the lens component is placed on the mounting surface of the substrate, the axis alignment of the lens component with respect to the observation direction is performed so that each second transmission region is located within the corresponding first transmission region, thereby achieving such centering that each reference mark on the substrate is further located within the corresponding second transmission region when viewed along the observation direction. In this case, each second transmission region is located within the corresponding first transmission region, so that the observation direction can be made perpendicular to the first surface and the second surface; and each reference mark is located within the corresponding second transmission region when viewed along the observation direction, so that alignment in the plane direction between the substrate and the lens component can be performed to achieve centering between the lens and the optical device. These improve the efficiency of optical coupling between the optical device and the lens.

An optical connector cable according to one embodiment of the present disclosure comprises the optical component having any of the above-described embodiments, and an optical fiber cable including at least one optical fiber. The optical fiber has an end to be installed to the optical component. The optical fiber cable is attached to the optical component so that the optical fiber is optically coupled to the optical device through the lens. In the optical connector cable, as in the above-described case, each second transmission region of the optical component is located within the corresponding first transmission region, so that the tilt angle of the lens component can be set to a desired value to achieve the axis alignment between the lens and the optical device; and each reference mark is located within the corresponding second transmission region, so that alignment in the plane direction between the substrate and the lens component can be performed to achieve centering between the optical device and the lens. These improve the efficiency of optical coupling between the optical device and the lens, and the optical fiber.

A lens component according to one embodiment of the present disclosure comprises a first surface, a second surface opposite to the first surface, a lens configured to optically couple to an external optical device, at least two first transmission regions formed on the first surface, at least two second transmission regions formed in positions facing the first transmission regions on the second surface, and an uneven region of the first surface, the uneven region surrounding the first transmission regions. Each of the second transmission regions is smaller than the facing first transmission region, and an arithmetic mean roughness Ra of the uneven region is greater than or equal to 0.20 μm. Use of such a lens component provides the above-described acts and effects.

Details of Embodiments of the Present Invention

An optical component and optical connector cable according to embodiments of the present disclosure will now be described with reference to the accompanying drawings. The present invention is not limited to the examples but shown by the claims, and it is intended that all modifications within meanings and a scope equal to those of the claims are included.

Figure 1B:
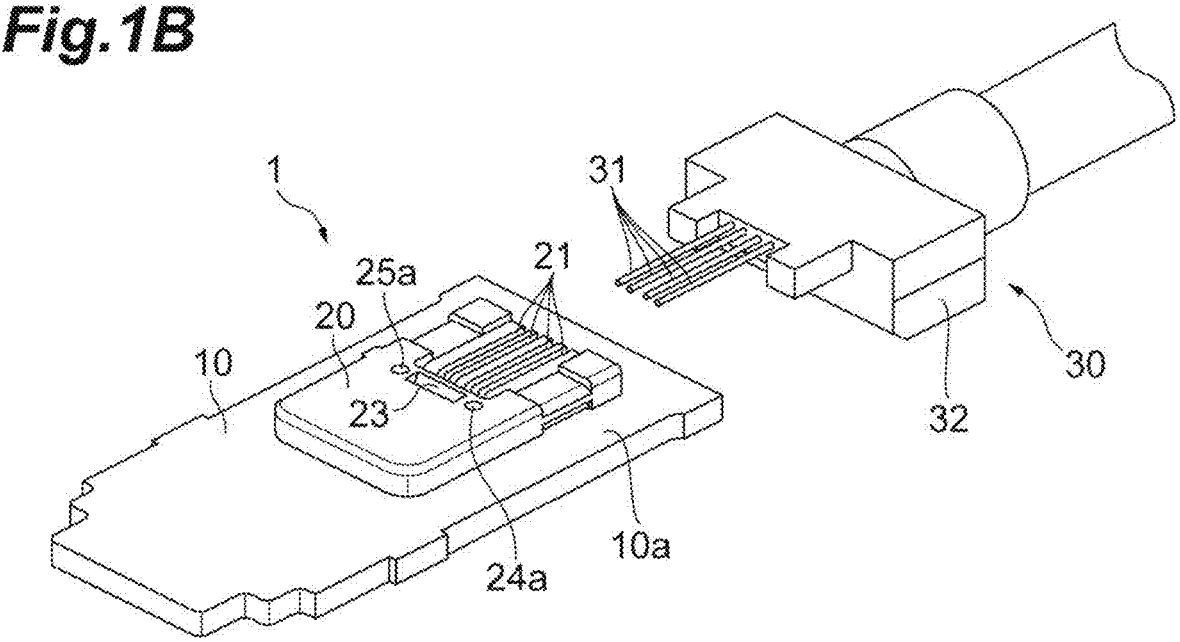
FIG. 1B is a perspective view showing the state of the optical connector cable shown in FIG. 1A before an optical fiber cable is attached to an optical component.

An optical connector cable 100 including an optical component 1 according to this embodiment will be described with reference to FIGS. 1A and 1B. FIG. 1A is a perspective view showing one embodiment of the optical connector cable 100, and FIG. 1B is a perspective view showing the state of the optical connector cable 100 before the optical fiber cable 30 is attached to the optical component 1. As shown in FIGS. 1A and 1B, the optical connector cable 100 includes a circuit board 10, a lens component 20, and an optical fiber cable 30. Photoelectric conversion elements 14 and 15 (optical devices (see FIG. 2)) are mounted on a top surface 10a (a mounting surface) of the circuit board 10. The lens component 20 is attached and fixed to the top surface 10a of the circuit board 10.

The optical fiber cable 30 houses most portions of the optical fibers 31 therein and exposes tip portions of the optical fibers 31 to outside of the cable. The lens component 20 optically couples the optical fibers 31 to the photoelectric conversion elements 14 and 15. A holder 32 of the optical fiber cable 30 determines the fiber pitch between the tip portions of the optical fibers 31 and the direction in which the optical fibers 31 extend. As one example shown in FIG. 1B, the holder 32 arranges the tip portions of the optical fibers 31 to be in parallel with each other. The arranged tip portions of the optical fibers 31 are placed in the respective channels 21 formed on the top surface of the lens component 20. The lens component 20 orients light horizontally propagating from the optical fibers 31 in the vertical direction with a light reflective surface 23 which changes the propagation direction of light, or orients light vertically propagating from the photoelectric conversion elements 14 and 15 in the horizontal direction with the light reflective surface 23. Moreover, lenses 26 and 27 (see FIGS. 4B and 4C) are formed between the photoelectric conversion elements 14 and 15 inside the lens component 20 and the light reflective surface 23. The lenses 26 and 27 are configured to optically couple to the photoelectric conversion elements 14 and 15 mounted on the circuit board 10. In the lens component 20, at least the region that light propagates is composed of a transparent material which can propagate light, for example, glass, a transparent resin, or the like so that light can propagate its inside, for example, the light reflective surface 23 and the lenses 26 and 27.

Figure 2:
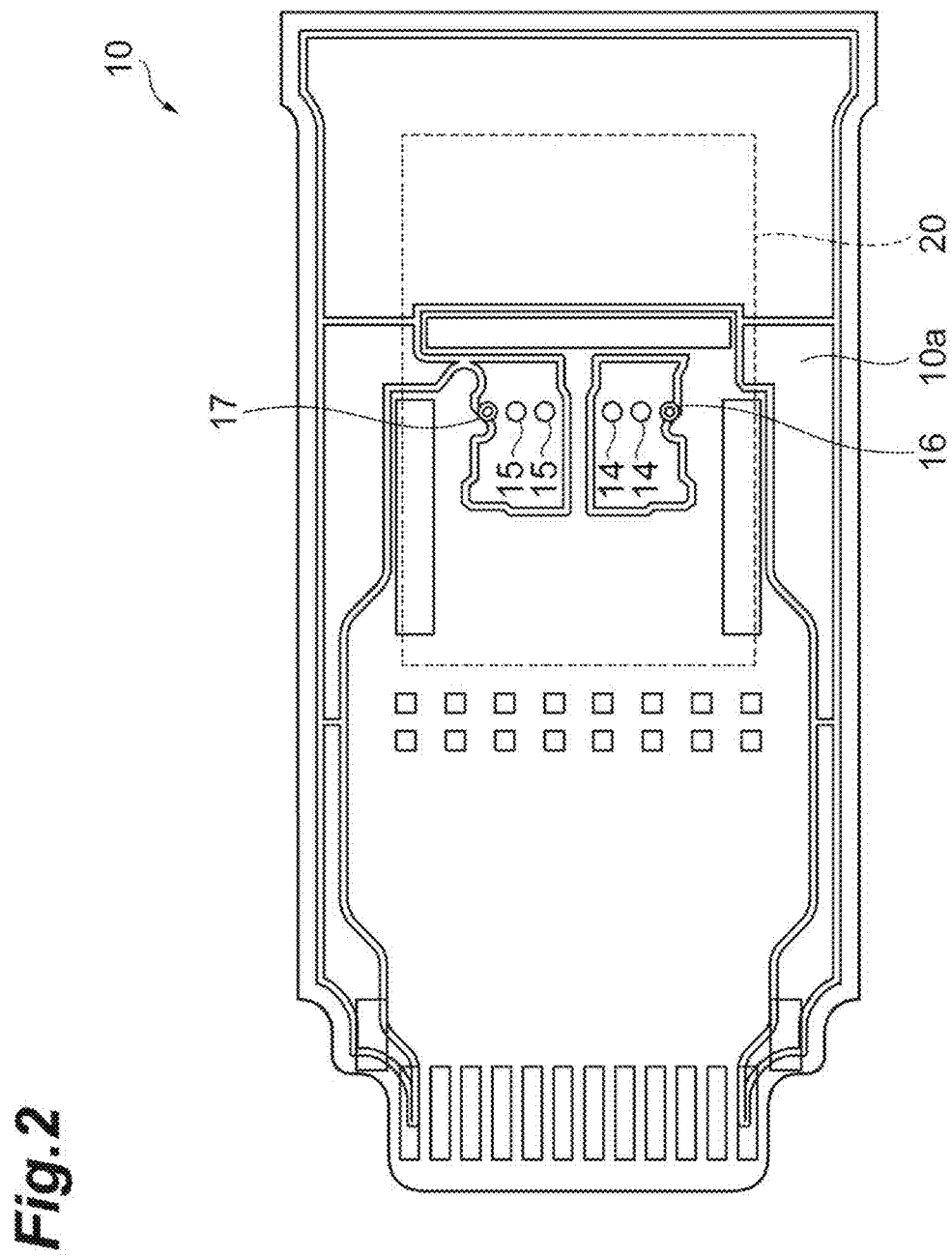
FIG. 2 is a plan view showing a circuit board of the optical component shown in FIG. 1B.
Figure 3:
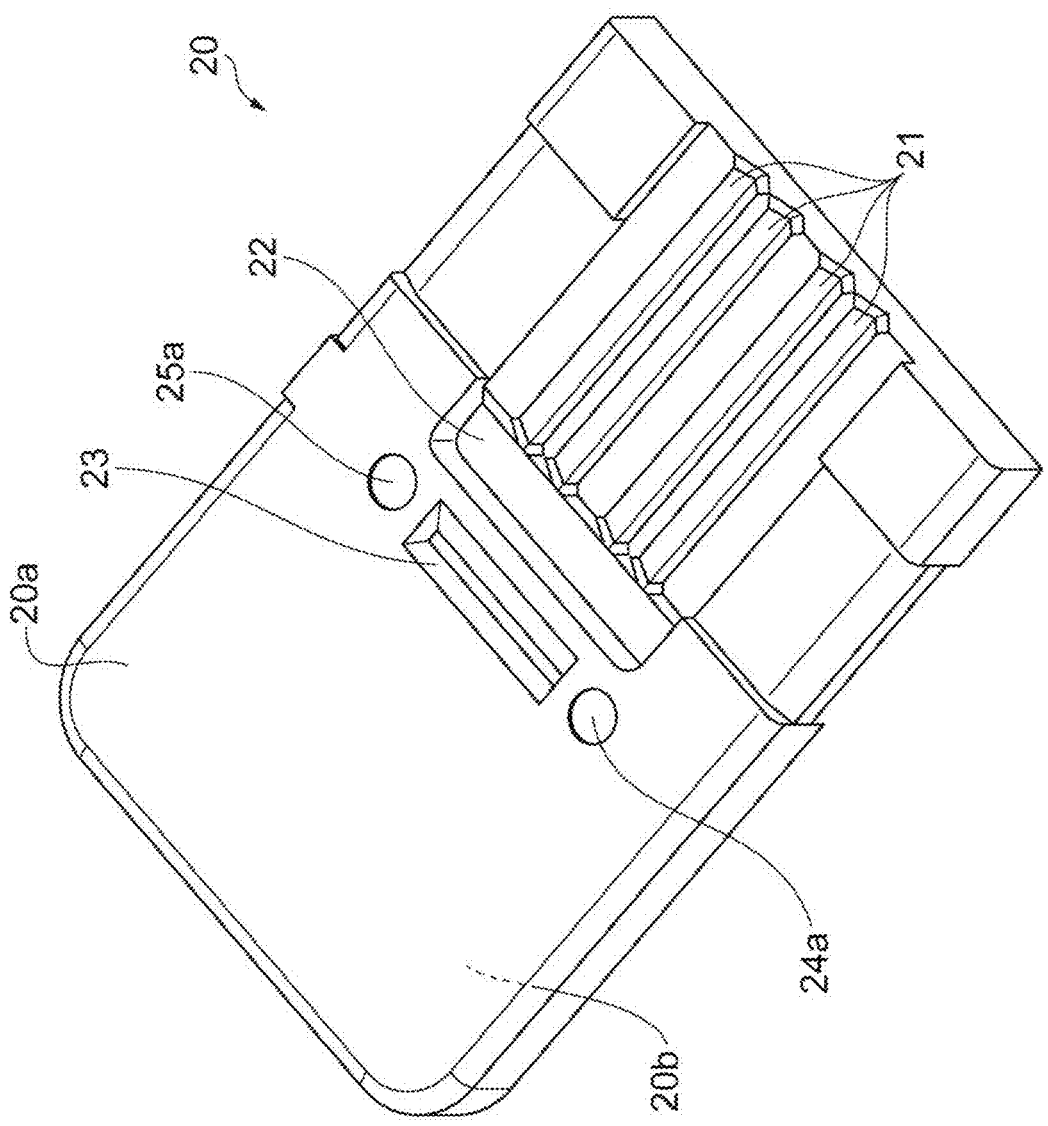
FIG. 3 is a perspective view showing a lens component of the optical component shown in FIG. 1B.

The optical component 1 including the circuit board 10 and the lens component 20 will now be described more in detail with reference to FIGS. 2 to 4C. FIG. 2 is a plan view showing the mounting surface of the circuit board 10. In FIG. 2, for convenience of description, part of wiring or mounted components is omitted. The dotted rectangle shown in a FIG. 2 shows a region to which the lens component 20 is to be attached. FIG. 3 is a perspective view showing the lens component 20. FIG. 4A is a plan view showing the optical component 1 in which the lens component 20 is mounted on the circuit board 10, FIG. 4B is a partially enlarged plan view of the optical component 1, and FIG. 4C is a sideview of the optical component 1. As shown in FIGS. 4A to 4C, the optical component 1 includes the circuit board 10 and the lens component 20 provided on the circuit board 10.

As shown in FIG. 2, the circuit board 10 is a generally rectangular substrate. The circuit board 10 provides various kinds of wirings on the top surface 10a (mounting surface) and mounts various kinds of electronic components, the photoelectric conversion elements 14 and 15, and the like on the top surface 10a. The photoelectric conversion elements 14 and 15 are, for example, light emitting devices, such as vertical cavity surface emitting lasers (VCSELs), or light receiving elements, such as photodiodes (PD). In addition, two reference marks 16 and 17 for alignment in the plane direction with respect to the lens component 20 are provided on the top surface 10a of the circuit board 10. The reference marks 16 and 17 function as fiducial marks. The reference marks 16 and 17 are provided in predetermined positions, for example, with respect to the photoelectric conversion elements 14 and 15 so that the photoelectric conversion elements 14 and 15 and the lenses 26 and 27 of the lens component 20 (see FIGS. 4B and 4C) are located in positions where desired optical coupling is obtained therebetween when the lens component 20 is attached to the circuit board 10. In one embodiment shown in FIG. 2, the reference marks 16 and 17 are formed outside the both ends of the photoelectric conversion elements 14 and 15 as an example. That is, the photoelectric conversion elements 14 and 15 are located between the reference marks 16 and 17 on the top surface 10a. The photoelectric conversion elements 14 and 15 and the reference marks 16 and 17 may be aligned in one direction. Note that the reference marks 16 and 17 may be provided in positions with respect to other members or structures as long as appropriate optical coupling between the photoelectric conversion elements 14 and 15 and the lenses 26 and 27 is obtained.

The reference marks 16 and 17 with such a function have a circular shape that is, for example, 0.15 mm in diameter. The reference marks 16 and 17 can be a metal pattern formed by subjecting a metal foil, such as a copper foil, on the top to an etching process for forming wiring. The reference marks 16 and 17 may be formed by removing the corresponding portions of a metal foil, such as a copper foil, by etching to partially expose the insulating layer of the circuit board, or, in contrast, may be formed by removing the portion of the metal foil other than the portions corresponding to the reference marks by etching. When the reference marks are formed using an insulating layer, it is preferable that the color of the insulating layer be a deep color, such as black, brown, green, or blue. When an imaging device recognizes the reference marks, the imaging device detects the boundary of the metal portion (usually in gold) of the circuit board and the insulating layer portion. When the color of the insulating layer is a deep color, the contrast between them can be increased and the accuracy of edge detection and the accuracy of calculation of the center of each reference mark can be enhanced.

As shown in FIG. 3, the lens component 20 is a generally rectangular plate unit entirely composed of a light-transmitting material. The lens component 20 has, adjacent to the front end (in the drawing toward the lower right), channels 21 in which the optical fibers 31 are to be placed respectively, and a depression 22 for receiving the excessive adhesive when the optical fibers 31 are fixed with the adhesive. The lens component 20 has, adjacent to the back end (in the drawing toward the upper left) the light reflective surface 23 for optically coupling the photoelectric conversion elements 14 and 15 to the optical fibers 31, and the first transmission regions 24a and 25a provided at the both ends of the light reflective surface 23. The first transmission regions 24a and 25a have a circular shape that is 0.5 mm in diameter, for example. The light reflective surface 23 consists of slopes down inward, orients the light horizontally propagating from the optical fibers 31 toward the photoelectric conversion element 14 (light receiving element), and orients the light vertically propagating from the photoelectric conversion element 15 (light emitting device) toward the optical fibers 31. Moreover, as shown in FIG. 4C, the lens component 20 has the lenses 26 and 27 inside. The lenses 26 and 27 are provided in the positions in which they face and optically coupled to the photoelectric conversion elements 14 and 15 when the lens component 20 is attached to the circuit board 10. The light from the optical fibers 31 is oriented toward the circuit board 10 on the light reflective surface 23 and is optically coupled to the photoelectric conversion elements 14 through the lens 26, and the light from the photoelectric conversion elements 15 is oriented toward the optical fibers 31 through the lens 27 on the light reflective surface 23 and is optically coupled at the ends of the optical fibers 31. The lens component 20, which has such a configuration, may be composed of, for example, glass or a transparent resin. Examples of the transparent resin include polyetherimide resins.

The first transmission regions 24a and 25a are transparent circular windows through which the inside of the optical component 1 can be recognized (visually recognized) from outside the lens component 20 and the edges of which can be recognized. The first transmission regions 24a and 25a are positioning mechanisms provided respectively for the reference marks 16 and 17 and are aligned with the reference marks 16 and 17 when the lens component 20 is attached to the circuit board 10, thereby locating the lens component 20 in a desired position in the circuit board 10. To be specific, the first transmission regions 24a and 25a are provided in predetermined positions, for example, with respect to the lenses 26 and 27 so that the photoelectric conversion elements 14 and 15 and the lenses 26 and 27 are located in positions where desired optical coupling is obtained therebetween when the lens component 20 is attached to the circuit board 10. In one embodiment shown in FIG. 4B, the first transmission regions 24a and 25a are provided outside the both ends of the lenses 26 and 27 in a plan view, as an example. The first transmission regions 24a and 25a may be provided in positions with respect to other members or structures as long as appropriate optical coupling between the photoelectric conversion elements 14 and 15 and the lenses 26 and 27 is obtained. The first transmission regions 24a and 25a are provided on the outer surface 20a of the lens component 20.

The second transmission regions 24b and 25b are provided on the inner surface 20b (see FIG. 5) parallel with the outer surface 20a. The second transmission regions 24b and 25b can be recognized (visually recognized) through the first transmission regions 24a and 25a from outside the lens component 20, and the circuit board 10 can be recognized (visually recognized) through the first transmission regions 24a and 25a and the second transmission regions 24b and 25b from outside the lens component 20. The second transmission regions 24b and 25b are, for example, transparent circular windows which are 0.3 mm in diameter and the edges of which can be recognized (see FIG. 5). The center positions of the first transmission region 24a and the second transmission region 24b are aligned along a direction perpendicular to the outer surface 20a and the inner surface 20b parallel with it, and the center positions of the first transmission region 25a and the second transmission region 25b are aligned along a direction perpendicular to the outer surface 20a and the inner surface 20b parallel with it. For this reason, the second transmission regions 24b and 25b are positioning mechanisms provided respectively for the reference marks 16 and 17 and the first transmission regions 24a and 25a or the second transmission regions 24b and 25b are aligned with the reference marks 16 and 17 when the lens component 20 is attached to the circuit board 10, thereby locating the lens component 20 in a desired position in the circuit board 10.

The first transmission region 24a and the second transmission region 24b, and the first transmission region 25a and the second transmission region 25b are also the positioning mechanisms for adjusting the tilt of the lens component 20 to the observation direction D. The outer diameters of the first transmission regions 24a and 25a on the outer surface 20a are larger than those of the second transmission regions 24b and 25b on the inner surface 20b. The first transmission regions 24a and 25a and the second transmission regions 24b and 25b are formed in the lens component 20 so that the outer surface 20a of the lens component 20 and the central axis which connects the center of the first transmission regions 24a and 25a and the center of the second transmission regions 24b and 25b can be orthogonal to each other. The first transmission regions 24a and 25a and the second transmission regions 24b and 25b are designed so as to cause the lens component 20 to tilt at a predetermined angle when each center of the first transmission regions 24a and 25a are aligned with each center of the second transmission regions 24b and 25b. The shape of the first transmission regions 24a and 25a and the second transmission regions 24b and 25b is circular, for example, but may be any other shape, such as a square, a triangle, or an ellipse, that allows for the calculation of the center along the plane direction. Moreover, the outer diameter or width of the first transmission regions 24a and 25a may be at least 1.25 times the outer diameter or width of the second transmission regions 24b and 25b. Thus, if there is a much difference between the outer diameters or widths of the first transmission regions 24a and 25a and the respective second transmission regions 24b and 25b, it is easier to recognize a difference between their centers by using an imaging device or visual recognition.

The entire outer surface 20a surrounding the first transmission regions 24a and 25a which have such a function, and the entire inner surface 20b surrounding the second transmission regions 24b and 25b are embossed so that the visible light transmittance of the first transmission regions 24a and 25a is higher than the visible light transmittance of the outer surface 20a surrounding the first transmission regions 24a and 25a, and the visible light transmittance of the second transmission regions 24b and 25b is higher than the visible light transmittance of the inner surface 20b surrounding the second transmission regions 24b and 25b. In other words, the outer surface 20a surrounding the first transmission regions 24a and 25a, and the inner surface 20b surrounding the second transmission regions 24b and 25b have a frosted glass-like surface made by embossing. Further, the outer surface 20a surrounding the first transmission regions 24a and 25a, and the inner surface 20b surrounding the second transmission regions 24b and 25b are made uneven by embossing so that, for example, the arithmetic mean roughness Ra of the outer surface 20a and the inner surface 20b is greater than or equal to 0.2 µm. The outer surface 20a surrounding the first transmission regions 24a and 25a, and the inner surface 20b surrounding the second transmission regions 24b and 25b may have a maximum height roughness Rz of greater than or equal to 2.0 µm. The outer surface 20a surrounding the first transmission regions 24a and 25a, and the inner surface 20b surrounding the second transmission regions 24b and 25b can be embossed by molding done by forming a rough surface by performing electric-discharge machining on a corresponding portion of a mold for molding the lens component 20. On the other hand, the first transmission regions 24a and 25a and the second transmission regions 24b and 25b are mirror-finished so that their arithmetic mean roughness Ra is less than or equal to 0.02 µm and their maximum height roughness Rz is less than or equal to 0.5 µm. Note that "arithmetic mean roughness Ra" and "maximum height roughness Rz" used here are defined according to JIS B 0601:2013. Moreover, "visible light" here is light with a wavelength in the range of 480 to 800 nm including at least the sensitivity light wavelength of an imaging device used for the alignment between the first transmission regions 24a and 25a, the second transmission regions 24b and 25b, and the reference marks 16 and 17. Note that the transmittances of the first transmission regions 24a and 25a, the second transmission regions 24b and 25b, the outer surface 20a, and the inner surface 20b are values that can be set as surface properties at the time of design and analysis of optical properties. In the actual lens component 20, the transmittance of visible light entering the first transmission region 24a and emerging from the second transmission region 24b is higher than the transmittance of visible light entering the outer surface 20a surrounding the first transmission region 24a and emerging from the inner surface 20b surrounding the second transmission region 24b; and the transmittance of visible light entering the first transmission region 25a and emerging from the second transmission region 25b is higher than the transmittance of visible light entering the outer surface 20a surrounding the first transmission region 25a and emerging from the inner surface 20b surrounding the second transmission region 25b.

As described above, for the first transmission regions 24a and 25a and the second transmission regions 24b and 25b, the inner side and the outer side exhibit different transmittances of visible light; therefore, the outer edges of the first transmission regions 24a and 25a and the outer edges of the second transmission regions 24b and 25b can be recognized easily and reliably with an imaging device or the like. If the outer edges of the first transmission regions 24a and 25a and the outer edges of the second transmission regions 24b and 25b can be recognized with an imaging device or the like, the outer surface 20a surrounding the first transmission regions 24a and 25a, and the inner surface 20b surrounding the second transmission regions 24b and 25b may be subjected to coloring instead of or in addition to embossing.

The relationship between the first transmission regions 24a and 25a, the second transmission regions 24b and 25b, and the reference marks 16 and 17 in the optical component 1 in which the lens component 20 is attached to the circuit board 10 will now be described with reference to FIGS. 4A to 4C. As shown in FIG. 4A, the lens component 20 is attached on the top surface 10a of the circuit board 10 so that the photoelectric conversion elements 14 and 15 and the reference marks 16 and 17 can be located within the lens component 20.

In this case, the attachment is made so that the light reflective surface 23 and the lenses 26 and 27 may be located generally above the photoelectric conversion elements 14 and 15. As for the first transmission regions 24a and 25a and the second transmission regions 24b and 25b, as shown in FIG. 4B, the lens component 20 is attached to the circuit board 10 with a manufacturing method, which will be described later, so that the second transmission regions 24b and 25b on the inner surface 20b are respectively located within the first transmission regions 24a and 25a on the outer surface 20a, and the reference marks 16 and 17 on the circuit board 10 are respectively located within the second transmission regions 24b and 25b when viewed along the observation direction orthogonal to the outer surface 20a and the inner surface 20b of the lens component 20. To be specific, the lens component 20 is attached to the circuit board 10 so that the centers of the first transmission regions 24a and 25a are aligned with the centers of the respective second transmission regions 24b and 25b and the centers of the second transmission regions 24b and 25b are aligned with the centers of the respective reference marks 16 and 17. The thickness (the distance between the outer surface 20a and the inner surface 20b) of the portions in which the first transmission regions 24a and 25a and the second transmission regions 24b and 25b of the lens component 20 are formed is 0.6 mm, for example. The distance between the inner surface 20b of the lens component 20 and the top surface 10a of the circuit board 10 in the state where the lens component 20 is attached to the circuit board 10 is 0.5 mm, for example.

A method of manufacturing the optical component 1 with such a configuration will now be explained. First, as shown in FIG. 2, the circuit board 10 is prepared in which the photoelectric conversion elements 14 and 15 are mounted on the top surface 10a and the reference marks 16 and 17 are provided on the top surface 10a. Further, as shown in FIG. 3, the lens component 20 is prepared. The lens component 20 includes the outer surface 20a located outside, the inner surface 20b opposite to the outer surface 20a and located inside, the lenses 26 and 27 and the light reflective surface 23 configured to be optically coupled to the photoelectric conversion elements 14 and 15, the first transmission regions 24a and 25a faulted on the outer surface 20a, the second transmission regions 24b and 25b which are formed on the inner surface 20b parallel with the outer surface 20a and have center positions that are aligned with the facing first transmission regions 24a and 25a when viewed along a direction perpendicular to the outer surface 20a. The outer surface 20a surrounding the first transmission regions 24a and 25a of the lens component 20 prepared here is entirely embossed to have a frosted glass-like texture. The inner surface 20b surrounding the second transmission regions 24b and 25b is also entirely embossed to have a frosted glass-like texture. That is, a surface region of the outer surface 20a except the first transmission regions 24a and 25a, a depression 22 and the light reflective surface 23 may be entirely embossed, and a surface region of the inner surface 20b except the second transmission regions 24b and 25b may be entirely embossed. Since the outer surface 20a is embossed, component adsorption can be easily achieved at the time of the attachment of the lens component 20 to the circuit board 10.

Subsequently, as shown in FIG. 5, the lens component 20 is placed on the top surface 10a of the circuit board 10, and then axis alignment (i is performed with an imaging device (not shown in the drawing) installed above the lens component 20 (opposite from the circuit board) so that the second transmission regions 24b and 25b on the inner surface 20b are respectively located within the first transmission regions 24a and 25a on the outer surface 20a. At the time of the axis-alignment G, axis alignment is performed so that the centers of the first transmission regions 24a and 25a and the centers of the respective second transmission regions 24b and 25b are aligned. The axis alignment G makes the observation direction D of the imaging device be orthogonal to the outer surface 20a and the inner surface 20b.

Subsequently, centering H is performed so that the reference marks 16 and 17 on the circuit board 10 are located within the respective second transmission regions 24b and 25b when viewed along the observation direction D. At the time of the centering H, centering is performed so that the centers of the reference marks 16 and 17 on the circuit board 10 are aligned with the centers of the respective second transmission regions 24b and 25b. The centering H sets the position of the lens component 20 along the parallel direction with respect to the circuit board 10 to a predetermined position, thereby achieves positioning between the photoelectric conversion elements 14 and 15 and the lenses 26 and 27. These axis alignment G and centering H provide the relationship among the first transmission regions 24a and 25a, the second transmission regions 24b and 25b, and the reference marks 16 and 17 shown in FIG. 6. Note that the axis-alignment G and the centering H mentioned above are typically performed by recognizing each position (center) using an imaging device. Through the axis-alignment G mentioned above, in general, the observation direction D can be made completely orthogonal to the outer surface 20a and the inner surface 20b at the cost of the attachment accuracy of an inside image-receiving element and a lens system included in the imaging device. After the observation direction D is made completely orthogonal to the outer surface 20a and the inner surface 20b, the centering of the reference marks 16 and 17 along the observation direction D is performed during the centering H, so that the positions of the reference marks 16 and 17 can be aligned with the positions of the first transmission regions 24a and 25a and the second transmission regions 24b and 25b when viewed along the direction orthogonal to the outer surface 20a and the inner surface 20b. Although it is preferable that the reference marks 16 and 17 be smaller than the second transmission regions 24b and 25b, even if the allowable gap is a maximum value, the difference T between them can be set to such a value that the reference marks 16 and 17 are located within the second transmission regions 24b and 25b, taking mounting tolerance into consideration. The mounting tolerance here can be determined by the lowest optical coupling efficiency needed between the optical fibers and the photoelectric conversion elements.

Subsequently, upon termination of the axis-alignment G and the centering H, the lens component 20 is attached to the circuit board 10 with an adhesive or the like so that they are fixed to each other. Through the above process, the optical component 1 shown in FIGS. 4A to 4C is fabricated. The lens component 20 has a portion around the inner surface 20b for support with respect to the top surface 10a of the circuit board 10. This support portion places the inner surface 20b and the top surface 10a to be generally parallel with each other with a fixed distance when the lens component 20 is placed on the circuit board 10 (see FIG. 5).

The advantageous effects of the optical component 1 fabricated by the above-described manufacturing method will now be described. As described above, the optical component 1 provides the first transmission regions 24a and 25a on the outer surface 20a and the second transmission regions 24b and 25b on the inner surface 20b. The lens component 20 is attached to the circuit board 10 so that the second transmission regions 24b and 25b are located within the respective first transmission regions 24a and 25a and the reference marks 16 and 17 on the circuit board 10 are further located within the respective second transmission regions 24b and 25b. Since the second transmission regions 24b and 25b are located within the respective first transmission regions 24a and 25a and, preferably, the centers of the second transmission regions 24b and 25b are further aligned with the centers of the respective first transmission regions 24a and 25a, the observation direction D can be made perpendicular to the outer surface 20a and the inner surface 20b, thereby achieving the axis alignment between the lenses 26 and 27 and the photoelectric conversion elements 14 and 15. Further, since the reference marks 16 and 17 are located within the respective second transmission regions 24b and 25b and, preferably, the centers of the reference marks 16 and 17 are aligned with the centers of the respective second transmission regions 24b and 25b, the alignment between the lens component 20 and the circuit board 10 along the plane direction can be performed, thereby achieving the centering between the lenses 26 and 27 and the photoelectric conversion elements 14 and 15. Thus, the optical component 1 according to this embodiment improves the efficiency of optical coupling between the photoelectric conversion elements 14 and 15 and the lenses 26 and 27 (and the optical fibers 31).

The lens component 20 of the optical component 1 is composed of a transparent resin. Thus, the transparent lens component 20 facilitates the alignment between the first transmission regions 24a and 25a and the second transmission regions 24b and 25b, and the alignment between the second transmission regions 24b and 25b and the reference marks 16 and 17. In addition, since the first transmission regions 24a and 25a and the second transmission regions 24b and 25b are not void spaces and serve as positioning marks of the lens component, the lens component 20 suppresses the entry of foreign matters into the optical component 1, thereby the optical component 1 eliminates the need for providing a separate lid member for suppressing the entry of foreign matters.

In the optical component 1, the arithmetic mean roughness Ra in the first transmission regions 24a and 25a and the second transmission regions 24b and 25b may be less than or equal to 0.02 µm, and the arithmetic mean roughness Ra of the outer surface 20a surrounding the first transmission regions 24a and 25a and the inner surface 20b surrounding the second transmission regions 24b and 25b may be greater than or equal to 0.20 µm. The difference between the above arithmetic mean roughness Ra makes the outer edges of the first transmission regions 24a and 25a and the second transmission regions 24b and 25b be more definite, thereby the alignment between the first transmission regions 24a and 25a and the second transmission regions 24b and 25b can be made more reliably. In other words, the optical component 1 with the above arithmetic mean roughness Ra further improves the efficiency of optical coupling between the photoelectric conversion element and the lens by more reliably performing axis alignment through adjustment of tilt with respect to the observation direction D of the lens component 20.

In the optical component 1, the maximum height roughness Rz in the first transmission regions 24a and 25a and the second transmission regions 24b and 25b may be less than or equal to 0.5 µm, and the maximum height roughness Rz of the outer surface 20a surrounding the first transmission regions 24a and 25a and the inner surface 20b surrounding the second transmission regions 24b and 25b may be greater than or equal to 2.0 µm. The difference between the above maximum height roughness Rz makes the outer edges of the first transmission regions 24a and 25a and the second transmission regions 24b and 25b be more definite, thereby the alignment between the first transmission regions 24a and 25a and the second transmission regions 24b and 25h can be made more reliably. In other words, the optical component 1 with the above maximum height roughness Rz further improves the efficiency of optical coupling between the photoelectric conversion element and the lens by more reliably performing axis alignment through tilt adjustment for the lens component 20.

In the optical component 1, the transmittance of visible light of each of the first transmission regions 24a and 25a may be higher than that of the corresponding outer surface 20a (embossed surface) surrounding the first transmission regions 24a and 25a, and the transmittance of visible light of each of the second transmission regions 24b and 25b may be higher than that of the corresponding inner surface 20b (embossed surface) surrounding the second transmission regions 24b and 25b. The optical component 1 with such transmittance can perform the alignment between the first transmission regions 24a and 25a and the second transmission regions 24b and 25b, and the alignment between the second transmission regions 24b and 25b and the reference marks 16 and 17 more reliably. In other words, the optical component 1 improves the efficiency of optical coupling between the photoelectric conversion element and the lens by more reliably performing centering through axis alignment made by tilt adjustment for the lens component 20, and alignment in the plane direction between the circuit board 10 and the lens component 20. Although the outer surface 20a surrounding the first transmission regions 24a and 25a is entirely embossed and the inner surface 20b surrounding the second transmission regions 24b and 25b is entirely embossed in this embodiment, embossing is not necessarily performed on the entire surface. That is, the embossing on the outer surface 20a or the inner surface 20b may be performed only on part of the outer surface 20a surrounding the first transmission regions 24a and 25a or part of the inner surface 20b surrounding the second transmission regions 24b and 25b. Regarding the area to be embossed in this case, the outer edges of the first transmission regions 24a and 25a and the second transmission regions 24b and 25b should be recognized visually or with an imaging device and, for example, the portion around each outer edge with a perimeter higher than or equivalent to the width of the corresponding transmission region should be embossed.

Each of the reference marks 16 and 17 of the optical component 1 may be a metal pattern. In this case, the reference marks 16 and 17 are easily recognized, which leads to more reliable alignment between the second transmission regions 24b and 25b and the reference marks 16 and 17. In other words, the reference marks 16 and 17 made by metal further improves the efficiency of optical coupling between the photoelectric conversion element and the lens by more reliably performing centering through alignment in the plane direction between the circuit board 10 and the lens component 20.

In the optical component 1, the outer diameter or width of the first transmission regions 24a and 25a may be at least 1.25 times the outer diameter or width of the second transmission regions 24b and 25b. In this case, alignment between the first transmission regions 24a and 25a and the second transmission regions 24b and 25b leads to more reliable tilt adjustment for the lens component 20. In other words, the lens component 20 having the above regions 24a, 24b, 25a and 25b further improves the efficiency of optical coupling between the photoelectric conversion element and the lens can by more reliably performing axis alignment through tilt adjustment for the lens component 20.

Figure 7C:
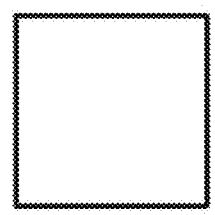
FIGS. 7A to 7D are plan views showing examples of the reference mark on the substrate.
Figure 7D:
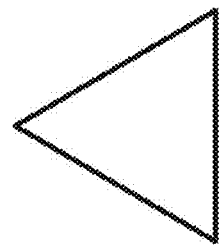
Figure 7A:
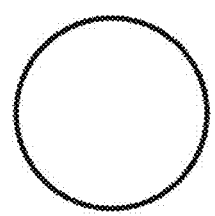
Figure 7B:
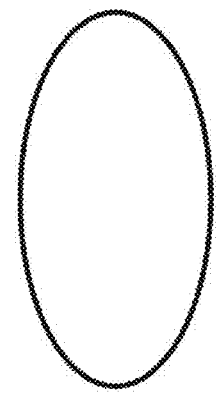
Figure 8C:
FIGS. 8A to 8D are plan views showing other examples of the reference mark on the substrate.
Figure 8D:
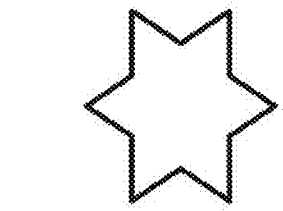
Figure 8A:
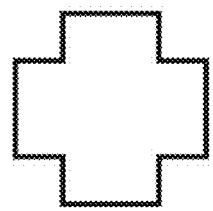
Figure 8B:
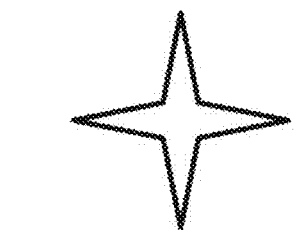

The optical component 1 and the optical connector cable 2 including the optical component 1 have been described so far, but the present invention should not be limited to these and various modifications can be made. For example, the shape of the reference marks 16 and 17 provided on the circuit board 10 of the optical component 1 is a circle in the above-described embodiment (see FIG. 7A), but may be, for example, the ellipse shown in FIG. 7B, the square shown in FIG. 7C, the triangle shown in FIG. 7D, the cross shown in FIG. 8A, or any of the various star shapes shown in FIGS. 8B to 8D.

The lens component 20 includes two first transmission regions and two second transmission regions, which are the first transmission regions 24a and 25a and the second transmission regions 24b and 25b, in this embodiment, but may include three or more first transmission regions and three or more second transmission regions. In this case, the number of the reference marks 16 and 17 provided on the circuit board 10 may also be changed depending on the number of first transmission regions and second transmission regions, and three or more marks may be provided. In this case, the attachment of the lens component 20 to the circuit board 10 can be made more accurately.

Examples

The present disclosure will now be described more in detail based on Examples, but the present invention is not limited to these Examples. Regarding Examples below, the arithmetic mean roughness Ra and maximum height roughness Rz of the outer surface 20a (embossed surface) surrounding the first transmission regions 24a and 25a in the lens component 20 with the configuration shown in FIG. 3 are respectively changed to the values shown in Table 1 and the definition of the outer edges of the first transmission regions 24a and 25a was checked. The inner surface 20b (embossed surface) surrounding the second transmission regions 24b and 25b was made uniform in a simple manner, and the arithmetic mean roughness Ra of the embossed surface was 0.8 μm, and the maximum height roughness Rz of the embossed surface was 8.0 μm.

Electric-discharge machining was first performed on the portions of a mold for forming the lens component 20 which correspond to the outer surface 20a (embossed surface) surrounding the first transmission regions 24a and 25a, and the inner surface 20b (embossed surface) surrounding the second transmission regions 24b and 25b, thereby forming a rough surface. Subsequently, the rough surface of the outer surface 20a around the first transmission regions 24a and 25a was grinded to change its roughness, thereby fabricating samples 1 to 6 of the lens component 20 by molding. Molding of the lens component 20 used polyetherimide resin.

The lens components 20 in the samples 1 to 6 formed by molding were then visually checked for whether the outer edges of the first transmission regions 24a and 25a are definite. If the results showed that the embossed surface of the lens component 20 had an arithmetic mean roughness of greater than or equal to 0.60 μm and a maximum height roughness of greater than or equal to 6.5 μm, the recognized outer edges of the first transmission regions 24a and 25a were definite (definition evaluation A). If the embossed surface of the lens component 20 had an arithmetic mean roughness of greater than or equal to 0.20 μm and a maximum height roughness of greater than or equal to 2.0 μm, the outer edges of the first transmission regions 24a and 25a were able to be recognized (definition evaluation B). If the embossed surface of the lens component 20 had an arithmetic mean roughness of less than 0.20 μm and a maximum height roughness of less than 2.0 μm, the outer edges of the first transmission regions 24a and 25a were hardly recognized (evaluation C). Note that, even in such a case, it was possible to take a countermeasure by increasing the detectivity of the imaging device for detecting the outer edges of the first transmission regions and the like. The relationship between the roughness and definition (evaluations A to C) related to the lens components 20 of the samples 1 to 6 was summarized into Table 1 below.

TABLE 1

|  | Arithmetic mean roughness (μm) | Maximum height roughness (μm) | Definition of outer edge of first transmission region |
|---|---|---|---|
| Sample 1 | 0.05 | 1.0 | C |
| Sample 2 | 0.15 | 1.5 | C |
| Sample 3 | 0.27 | 2.9 | B |
| Sample 4 | 0.40 | 3.8 | B |
| Sample 5 | 0.65 | 7.0 | A |
| Sample 6 | 0.95 | 9.0 | A |

Electric-discharge machining was performed on the mold for forming the lens component 20, to form a rough surface in above Examples; alternatively, chemical treatment by etching, sandblasting involving blowing an abrasive, or physical treatment, such as grinding with a coarse abrasive, may be performed for so-called embossing.

What is claimed is:

1. An optical component comprising:
   an optical device;
   a substrate having a mounting surface on which the optical device is mounted and at least two reference marks are provided; and
   a lens component disposed on the mounting surface, the lens component including a first surface located outside, a second surface opposite to the first surface and located inside, the second surface facing the mounting surface, a lens configured to optically couple to the optical device, at least two first transmission regions formed on the first surface, at least two second transmission regions formed in positions facing the first transmission regions on the second surface, wherein each of the second transmission regions is smaller than the corresponding first transmission region, at least one channel provided on the first surface, and a light reflective surface configured to change a propagation direction of light, the light reflective surface being located between the first transmission regions,
   wherein the lens component is attached to the substrate so that each of the second transmission regions is located within the corresponding first transmission region and each of the reference marks on the substrate is further located within the corresponding second transmission region when viewed along an observation direction orthogonal to the first surface.

2. The optical component according to claim 1, wherein the lens component is composed of a transparent resin.

3. The optical component according to claim 1, wherein an arithmetic mean roughness Ra in each of the first transmission regions is less than or equal to 0.02 μm, and an arithmetic mean roughness Ra of the first surface around each of the first transmission regions is greater than or equal to 0.20 μm.

4. The optical component according to claim 1, wherein a maximum height roughness Rz in each of the first transmission regions is less than or equal to 0.5 μm, and a maximum height roughness Rz of the first surface around each of the first transmission regions is greater than or equal to 2.0 μm.

5. The optical component according to claim 1, wherein transmittance of visible light entering each of the first transmission regions and emerging from the corresponding second transmission region facing the first transmission region is higher than transmittance of visible light entering the first surface around each of the first transmission regions and emerging from the second surface around the corresponding second transmission region.

6. The optical component according to claim 1, wherein each refere mark includes a metal pattern.

7. The optical component according to claim 1, wherein an outer diameter or width of each of the first transmission regions is at least 1.25 times an outer diameter or width of each of the second transmission regions.

8. The optical component according to claim 1, wherein the lens component is attached to the substrate so that the center of each of the first transmission regions, the center of the corresponding second transmission region, and the center of the corresponding reference mark are aligned when viewed along the observation direction.

9. The optical component according to claim 1, wherein the optical device is located between the reference marks on the mounting surface.

10. The optical component according to claim 9, wherein the optical device and the reference marks are aligned in one direction.

11. The optical component according to claim 1, wherein each shape of the reference marks is a circle, an ellipse, a square, a triangle, or a star shape.

12. An optical connector cable comprising:
    the optical component according to claim 1; and
    an optical fiber cable including at least one optical fiber, the optical fiber having an end to be installed to the optical component,
    wherein the optical fiber cable is attached to the optical component so that the optical fiber is optically coupled to the optical device through the lens.

13. A lens component comprising:
    a first surface;
    a second surface opposite to the first surface;
    a lens configured to optically couple to an external optical device;
    at least two first transmission regions formed on the first surface;
    at least two second transmission regions formed in positions facing the first transmission regions on the second surface;
    at least one channel provided on the first surface: and
    a light reflective surface configured to change a propagation direction of light, the light reflective surface being located between the first transmission regions,
    wherein each of the second transmission regions is smaller than the facing first transmission region.

14. The lens component according to claim 13, further comprising an uneven region of the first surface, the uneven region surrounding the first transmission regions, wherein an arithmetic mean roughness Ra of the uneven region is greater than or equal to 0.20 μm.

* * * * *